United States Patent
Suzuki et al.

(10) Patent No.: US 9,441,674 B2
(45) Date of Patent: Sep. 13, 2016

(54) BALL BEARING

(71) Applicant: JTEKT CORPORATION, Osaka-shi, Osaka (JP)

(72) Inventors: Akiyuki Suzuki, Nagoya (JP); Daisuke Okamoto, Osaka (JP); Hiroyuki Ohshima, Kashihara (JP); Atsushi Nagai, Kashiwara (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 14/581,368

(22) Filed: Dec. 23, 2014

(65) Prior Publication Data

US 2015/0176650 A1    Jun. 25, 2015

(30) Foreign Application Priority Data

| Dec. 25, 2013 | (JP) | 2013-266844 |
| Mar. 24, 2014 | (JP) | 2014-060188 |
| Mar. 24, 2014 | (JP) | 2014-060337 |
| Nov. 14, 2014 | (JP) | 2014-231364 |

(51) Int. Cl.
| *F16C 33/38* | (2006.01) |
| *F16C 33/66* | (2006.01) |
| *F16C 33/40* | (2006.01) |
| *F16C 19/18* | (2006.01) |

(52) U.S. Cl.
CPC ......... *F16C 33/6681* (2013.01); *F16C 33/405* (2013.01); *F16C 33/6674* (2013.01); *F16C 19/182* (2013.01)

(58) Field of Classification Search
USPC ................................................ 384/470, 523
See application file for complete search history.

(56) References Cited

U.S. PATENT DOCUMENTS

| 1,104,364 A | 7/1914 | Lockwood |
| 1,668,112 A | 5/1928 | Gibbons |
| 2,615,767 A | 10/1952 | Wallgren |
| 3,698,777 A | 10/1972 | McCoy |
| 3,767,278 A | 10/1973 | Knowles |
| 3,940,193 A | 2/1976 | Molloy |
| 4,728,204 A | 3/1988 | Colanzi et al. |

(Continued)

FOREIGN PATENT DOCUMENTS

| DE | 76 38 179 U1 | 6/1977 |
| EP | 1 574 729 A1 | 9/2005 |

(Continued)

OTHER PUBLICATIONS

U.S. Appl. No. 14/570,410, filed Dec. 15, 2014 in the name of Okamoto et al.

(Continued)

*Primary Examiner* — Phillip A Johnson
(74) *Attorney, Agent, or Firm* — Oliff PLC (57) ABSTRACT

A ball bearing includes an outer ring; an inner ring; a plurality of balls; and a cage that has an annular shape. Oil flows into an area between the outer ring and the inner ring from one side in an axial direction and flows out from the other side in the axial direction. The cage includes an annular portion provided on an oil inflow side, and bar portions extending from the annular portion toward an oil outflow side. An outer peripheral end portion of the annular portion is constituted by a corner portion at which an axial outer end face intersects with an outer peripheral surface. An axial position of a tip end of the corner portion is substantially same as an axial position of a side surface of the outer ring.

14 Claims, 8 Drawing Sheets

(56) References Cited

U.S. PATENT DOCUMENTS

| | | |
|---|---|---|
| 4,824,265 A | 4/1989 | Hofmann et al. |
| 5,316,394 A | 5/1994 | Gehring |
| 6,203,205 B1 | 3/2001 | Murai et al. |
| 7,871,201 B2 | 1/2011 | Ohshima et al. |
| 8,573,851 B2 | 11/2013 | Friedrich et al. |
| 8,746,983 B2 * | 6/2014 | Mitchell ............... F16C 19/163 384/470 |
| 8,790,019 B2 | 7/2014 | Fujiwara |
| 9,115,760 B1 | 8/2015 | Sakaguchi |
| 2005/0220383 A1 | 10/2005 | Yokota et al. |
| 2010/0111459 A1 | 5/2010 | Yasuda |
| 2010/0209036 A1 | 8/2010 | Ueno |
| 2011/0069920 A1 | 3/2011 | Aida |
| 2014/0187374 A1 | 7/2014 | Murakami |
| 2015/0104126 A1 | 4/2015 | Chudo et al. |
| 2015/0176650 A1 | 6/2015 | Suzuki et al. |

FOREIGN PATENT DOCUMENTS

| | | |
|---|---|---|
| EP | 2270347 A1 | 1/2011 |
| JP | S58-150620 U | 10/1983 |
| JP | 2004-245231 A | 9/2004 |
| JP | 2005-069421 A | 3/2005 |
| JP | 2007-225037 A | 9/2007 |
| JP | 2008-202785 A | 9/2008 |
| JP | 2008-223863 A | 9/2008 |
| JP | 2009-204068 A | 9/2009 |
| JP | 2010-007788 A | 1/2010 |
| JP | 2012-149744 A | 8/2012 |

OTHER PUBLICATIONS

U.S. Appl. No. 14/570,198, filed Dec. 15, 2014 in the name of Okamoto et al.
May 13, 2015 Office Action issued in U.S. Appl. No. 14/570,198.
Jul. 8, 2015 Extended European Search Report issued in European Patent Application No. 14198990.5.
Jul. 8, 2015 extended Search Report issued in European Patent Application No. 14198989.7.
Jul. 8, 2015 Extended Search Report issued in European Patent Application No. 14200290.6.
Mar. 2, 2016 Office Action Issued in U.S. Appl. No. 14/570,410.

* cited by examiner

POSITION OF END FACE OF CAGE (mm)

BALL BEARING

INCORPORATION BY REFERENCE

The disclosure of Japanese Patent Application No. 2014-231364 filed on Nov. 14, 2014 including the specification, drawings and abstract is incorporated herein by reference in its entirety.

BACKGROUND OF THE INVENTION

1. Field of the Invention

The invention relates to a ball bearing that is lubricated by oil.

2. Description of Related Art

A rolling bearing is used to support a rotary shaft of a rotation portion included in a vehicle, a machine tool, or the like, and a ball bearing is known as the rolling bearing.

Figure 8:
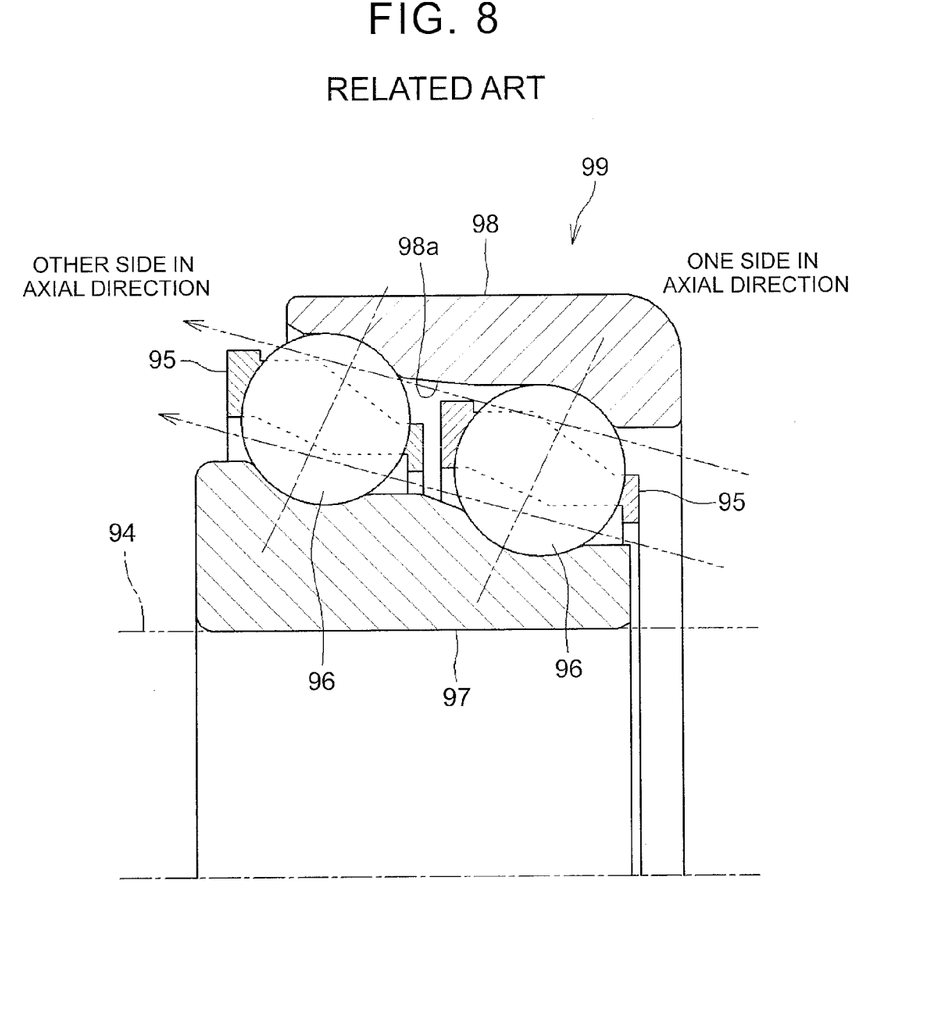
FIG. 8 is a sectional view of a ball bearing in related art.

FIG. 8 is a sectional view of a double row angular contact ball bearing 99 that supports a rotary shaft 94. The ball bearing 99 includes an outer ring 98, an inner ring 97, balls 96 disposed in double rows, and a cage 95 that retains the balls 96 in each row at intervals in a circumferential direction. The ball bearing 99 is lubricated by oil around the ball bearing 99. The ball bearing 99 is described in, for example, Japanese patent application publication No. 2010-7788.

In the ball bearing 99 shown in FIG. 8, the diameter of an inner peripheral surface 98a of the outer ring 98 increases from one side toward the other side in the axial direction. Therefore, when the inner ring 97 is rotated together with the rotary shaft 94, the oil flows in an area between the outer ring 98 and the inner ring 97 from the one side toward the other side in the axial direction (that is, a pumping action is caused). When the pumping action is caused due to the rotation of the ball bearing 99, the oil outside the bearing flows into the bearing inner area from the one side in the axial direction, and flows out from the other side in the axial direction. In FIG. 8, the flow of the oil is indicated by two-dot chain arrows.

When the oil passes through the bearing inner area, resistance to stirring is caused in the ball bearing 99. Therefore, as the amount of oil passing through the bearing inner area increases, the resistance to stirring increases, and as a result, the running torque of the ball bearing 99 increases. This decreases the rotational performance. The pumping action may be caused in a single row angular contact ball bearing, as well as in a double row angular contact ball bearing. Further, even in the case where the balls do not make angular contact with the inner ring and the outer ring, the pumping action may be caused depending on the shape of an inner peripheral surface of the outer ring, or the shape of an outer peripheral surface of the inner ring, or the pumping action may be caused by the rotation of the cage.

In the ball bearing described in Japanese Patent Application Publication No. 2010-7788, the size of an annular portion positioned on an oil inflow side in the cage is increased to reduce a clearance between the inner ring and the outer ring, and to reduce the inflow of the oil.

SUMMARY OF THE INVENTION

The invention provides a ball bearing that reduces inflow of oil into a bearing inner area.

A ball bearing according to a first aspect of the invention includes an outer ring; an inner ring; a plurality of balls disposed between the outer ring and the inner ring; and a cage that has an annular shape, and retains the balls at intervals in a circumferential direction. Oil flows into an area between the outer ring and the inner ring from one side in an axial direction and flows out from the other side in the axial direction. The cage includes an annular portion provided on an oil inflow side, and bar portions extending from the annular portion toward an oil outflow side. An outer peripheral end portion of the annular portion is constituted by a corner portion at which an axial outer end face of the annular portion intersects with an outer peripheral surface of the annular portion. An axial position of a tip end of the corner portion is substantially same as an axial position of a side surface of the outer ring.

In the above-described aspect of the invention, the outer peripheral end portion of the annular portion on the oil inflow side in the cage is constituted by the corner portion at which the axial outer end face of the annular portion intersects with the outer peripheral surface of the annular portion. The oil flows toward the outer side in the radial direction, along the axial outer end face of the annular portion due to the centrifugal force caused by the rotation of the ball bearing. When the oil passes by the corner portion, the oil flows away from the corner portion, and a low pressure region is formed at the back of the corner portion. An oil passage is formed in a space (an outer peripheral clearance) between the outer peripheral surface of the annular portion and the inner peripheral surface of the outer ring. In the above-described aspect of the invention, the axial position of the tip end of the corner portion is substantially the same as the axial position of the side surface of the outer ring, and therefore, the low pressure region is formed at an inlet portion (an axial outer portion) of the oil passage. As a result, the oil is unlikely to flow in a direction from the inlet portion (the axial outer portion) of the oil passage to the inner area of the ball bearing. Thus, it is possible to reduce the inflow of the oil into the inner area of the ball bearing through the outer peripheral clearance.

A ball bearing according to a second aspect of the invention includes an outer ring; an inner ring; a plurality of balls disposed between the outer ring and the inner ring; and a cage that has an annular shape, and retains the balls at intervals in a circumferential direction. Oil flows into an area between the outer ring and the inner ring from one side in an axial direction and flows out from the other side in the axial direction. The cage includes an annular portion provided on an oil inflow side, and bar portions extending from the annular portion toward an oil outflow side. An outer peripheral end portion of the annular portion is constituted by a corner portion at which an axial outer end face of the annular portion intersects with an outer peripheral surface of the annular portion. An axial position of a tip end of the corner portion is outside an axial position of a side surface of the outer ring in the axial direction.

In the above-described aspect of the invention, the outer peripheral end portion of the annular portion on the oil inflow side in the cage is constituted by the corner portion at which the axial outer end face of the annular portion intersects with the outer peripheral surface of the annular portion. The oil flows toward the outer side in the radial direction, along the axial outer end face of the annular portion due to the centrifugal force caused by the rotation of the ball bearing. When the oil passes by the corner portion, the oil flows away from the corner portion, and a low pressure region is formed at the back of the corner portion. An oil passage is formed in a space (an outer peripheral clearance) between the outer peripheral surface of the annular portion and the inner peripheral surface of the outer ring. In the above-described aspect of the invention, the axial position of the tip end of the corner portion is outside the axial position of the side surface of the outer ring in the axial direction, and therefore, the oil that has flowed away from the corner portion is unlikely to reach an inlet portion (an axial outer portion) of the oil passage, and the low pressure region is formed at the inlet portion (the axial outer portion) of the oil passage. As a result, the oil is unlikely to flow in a direction from the inlet portion (the axial outer portion) of the oil passage to the inner area of the ball bearing. Thus, it is possible to reduce the inflow of the oil into the inner area of the ball bearing through the outer peripheral clearance.

The axial outer end face of the annular portion may include an outer inclined surface that is inclined toward an axial outer side in a direction toward a radial outer side. In this case, the oil, which has flowed along the outer inclined surface of the annular portion, and flowed away from the corner portion, is unlikely to reach the inlet portion (the axial outer portion) of the oil passage, and thus, it is possible to reduce the inflow of the oil into the inner area of the ball bearing. In this case, the outer peripheral end portion of the annular portion may be constituted by the corner portion at which the outer peripheral surface of the annular portion intersects with the outer inclined surface at an acute angle. In this case, when the oil passes by the corner portion, the oil flows away from the corner portion easily, and thus, the low pressure region is stably formed.

The outer ring may include an annular main body and a protruding portion that is provided at a position facing the outer peripheral surface of the annular portion such that the protruding portion protrudes from the annular main body; and a raceway surface, on which the balls roll, may be provided in an inner peripheral side of the annular main body. In this case, the cage may be easily produced. In the case where the protruding portion is provided, the side surface of the outer ring, whose axial position is compared with the axial position of the tip end of the corner portion as described above, is the axial outer side surface of the protruding portion.

The outer peripheral surface of the annular portion may have a cylindrical surface whose center axis is an axis of the cage and the outer ring, and an inner peripheral surface of a portion of the outer ring may have a cylindrical surface whose center axis is the axis of the cage and the outer ring, the inner peripheral surface of the portion of the outer ring facing the outer peripheral surface of the annular portion. In this case, the oil passage with a cylindrical shape is formed in the space (the outer peripheral clearance) between the outer peripheral surface of the annular portion and the inner peripheral surface of the portion of the outer ring. In the above-described aspect of the invention, as described above, the axial position of the tip end of the corner portion is substantially the same as, or outside the axial position of the side surface of the outer ring in the axial direction. Therefore, the low pressure region is formed at the inlet portion (the axial outer portion) of the cylindrical oil passage. Since the outer peripheral surface of the annular portion, which forms the cylindrical oil passage, is a cylindrical surface whose center axis is the axis of the cage. Therefore, the oil on the cylindrical surface flows toward the outer side in the radial direction due to the centrifugal force, but the oil is unlikely to flow in the axial direction. As described above, the low pressure region is formed at the inlet portion (the axial outer portion) of the cylindrical oil passage. As a result, the oil is more unlikely to flow from the inlet portion (the axial outer portion) of the cylindrical oil passage toward the inner area of the ball bearing.

An axial position of an inner peripheral end portion of the annular portion may be inside an axial position of a side surface of the inner ring in the axial direction. The oil having a velocity component toward the radial outer side flows along the side surface of the inner ring due to the centrifugal force caused by the rotation of the ball bearing. When the oil flows away from the side surface, part of the oil flows toward the inner side in the axial direction. However, with the above-described configuration, since the axial position of the inner peripheral end portion of the annular portion on the oil inflow side in the cage is inside the axial position of the side surface of the inner ring, the part of the oil flows along the axial outer end face of the annular portion. Thus, it is possible to guide the oil toward the outer side in the radial direction, and to reduce the inflow of the oil into the bearing inner area. If the flow of the oil collides with the cage, and is blocked, pressure increases in a region where the collision occurs. The oil in the region where the pressure has increased is likely to flow into the inner area of the ball bearing through the cylindrical space, in which the pressure is relatively low, between the outer peripheral surface of the inner ring and the inner peripheral surface of the annular portion. However, according to the above-described aspect of the invention, the oil flows along the axial outer end face of the annular portion, and therefore, the flow of the oil is unlikely to be blocked by the cage (the annular portion), and as a result, it is possible to reduce the flow of the oil into the inner area of the ball bearing.

A ball bearing according to a third aspect of the invention includes an outer ring; an inner ring; a plurality of balls disposed between the outer ring and the inner ring; and a cage that has an annular shape, and retains the balls at intervals in a circumferential direction. Oil flows into an area between the outer ring and the inner ring from one side in an axial direction and flows out from the other side in the axial direction. The cage includes an annular portion provided on an oil inflow side, and bar portions extending from the annular portion toward an oil outflow side. An axial position of an inner peripheral end portion of the annular portion is inside an axial position of a side surface of the inner ring in the axial direction.

The oil having a velocity component toward the radial outer side flows along the side surface of the inner ring due to the centrifugal force caused by the rotation of the ball bearing. When the oil flows away from the side surface, part of the oil flows toward the inner side in the axial direction. However, according to the above-described aspect of the invention, the axial position of the inner peripheral end portion of the annular portion on the oil inflow side in the cage is inside the axial position of the side surface of the inner ring in the axial direction. Therefore, the part of the oil flows along the axial outer end face of the annular portion. Accordingly, it is possible to guide the oil toward the outer side in the radial direction, and to reduce the inflow of the oil into the bearing inner area. If the flow of the oil collides with the cage, and is blocked, pressure increases in the region where the collision occurs. The oil in the region where the pressure has increased is likely to flow into the inner area of the ball bearing through the cylindrical space, in which the pressure is relatively low, between the outer peripheral surface of the inner ring and the inner peripheral surface of the annular portion. However, according to the above-described aspect of the invention, the oil flows along the axial outer end face of the annular portion. Therefore, the flow of the oil is unlikely to be blocked by the cage (the annular portion). As a result, it is possible to reduce the flow of the oil into the inner area of the ball bearing.

In the ball bearing according to each of the above-described aspects, the axial outer end face of the annular portion may include an inner inclined surface that is inclined toward an axial inner side in a direction toward a radial outer side. In this case, the oil having a velocity component toward the radial outer side flows along the side surface of the inner ring due to the centrifugal force caused by the rotation of the ball bearing. When the oil flows away from the side surface, part of the oil flows toward the inner side in the axial direction. However, with the above-described configuration, the axial outer end face of the annular portion on the oil inflow side in the cage includes the inner inclined surface that is inclined toward the axial inner side in the direction toward the radial outer side. Therefore, the part of the oil flows along the inner inclined surface of the annular portion, and is guided toward the outer side in the radial direction. Thus, it is possible to reduce the inflow of the oil into the bearing inner area.

According to each of the above-described aspects of the invention, it is possible to provide the ball bearing that reduces the inflow of the oil into the bearing inner area so as to reduce the resistance to stirring of the oil and to reduce the torque during the rotation of the ball bearing.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS (Entire configuration of a ball bearing) Embodiments of the invention will be described with reference to FIG. 1. The ball bearing 1 is a double row angular contact ball bearing. The ball bearing 1 includes an outer ring 2 having outer raceway surfaces 16a, 16b provided on an inner periphery thereof; an inner ring 3 having inner raceway surfaces 11a, 11b provided on outer periphery thereof; a plurality of balls 4 that are rollably disposed between the outer raceway surface 16a and the inner raceway surface 11a on one side in an axial direction (a right side in FIG. 1); a plurality of balls 4 that are rollably disposed between the outer raceway surface 16b and the inner raceway surface 11b on the other side in the axial direction (a left side in FIG. 1); a cage 17 that retains the balls 4 included in a row on the one side in the axial direction such that the balls 4 are retained at equal intervals in a circumferential direction; and a cage 18 that retains the balls 4 included in a row on the other side in the axial direction such that the balls 4 are retained at equal intervals in the circumferential direction. Each of the outer ring 2, the inner ring 3, and the cages 17, 18 has an annular shape (a cylindrical shape) whose center axis is a common axis C, in each embodiment described below.

An outer peripheral surface 23 of the outer ring 2 has a cylindrical shape. A large end face 21 and a small end face 22, which are flat surfaces perpendicular to the axis C, are respectively provided at both ends of the outer ring 2 in the axial direction. Each of the outer raceway surfaces 16a, 16b has an arc shape. The outer raceway surface 16a on the one side in the axial direction is continuous with an inner peripheral cylindrical surface 31 of a shoulder portion that is formed coaxially with the axis C. The diameter of the outer raceway surface 16a is smaller than the diameter of the outer raceway surface 16b. In the entire outer ring 2, the diameter of the inner peripheral surface of the outer ring 2 increases from the one side in the axial direction toward the other side in the axial direction. The diameter of each of the outer raceway surfaces 16a, 16b increases from the one side toward the other side in the axial direction.

In the embodiment, the outer ring 2 includes an annular main body 32, and a protruding portion 33 that protrudes toward an inner side in the radial direction from an end portion of the annular main body 32 on the one side in the axial direction. The outer raceway surfaces 16a, 16b, on which the balls 4 roll, are provided in the inner peripheral side of the annular main body 32. The outer ring 2 is produced using a bearing steel. After a quenching process is performed, finishing is performed on the outer ring 2, by performing a grinding process on each surface of the outer ring 2.

An inner peripheral surface 25 of the inner ring 3 has a cylindrical shape. A large end face 26 and a small end face 27, which are flat surfaces perpendicular to the axis C, are respectively provided at both ends of the inner ring 3 in the axial direction. A cylindrical surface 24, which is coaxial with the axis C, is provided at the outer periphery of an end portion of the inner ring 3 on the one side in the axial direction. Each of the inner raceway surfaces 11a, 11b has an arc shape. The inner raceway surface 11a on the one side in the axial direction is continuous with the cylindrical surface 24. The diameter of the inner raceway surface 11a is smaller than the diameter of the inner raceway surface 11b. In the entire inner ring 3, the diameter of the outer peripheral surface of the inner ring 3 increases from the one side in the axial direction toward the other side in the axial direction. The inner ring 3 is produced using a bearing steel. After a quenching process is performed, finishing is performed on the inner ring 3 by performing a grinding process on each surface of the inner ring 3.

In the embodiment, each of the cages 17, 18 includes an annular portion 5 with a smaller diameter, an annular portion 6 with a larger diameter, and a plurality of bar portions 7 that are disposed at equal intervals in the circumferential direction and connect the annular portions 5, 6. Each of the cages 17, 18 is produced by injection molding using a synthetic resin such as polyphenylene sulfide or polyamide. Each space, which is provided between the annular portions 5, 6 and between the bar portions 7 adjacent to each other in the circumferential direction, is a pocket in which one ball 4 is retained. Each of the cages 17, 18 is positioned in the radial direction and the axial direction, when the pockets contact the balls 4. Thus, each of the cages 17, 18 is disposed close to the balls 4 so as to be positioned. However, clearances need to be provided between each of the cages 17, 18 and the balls 4 so that the balls 4 are able to roll. Therefore, predetermined clearances are provided between the cages 17, 18 and the outer and inner rings 2, 3 so that the cages 17, 18 do not contact the outer and inner rings 2, 3 when the ball bearing 1 is rotated.

When the inner ring 3 is rotated and the balls 4 are revolved, the cage 17 is guided by the balls 4 to revolve, and thus, the cage 17 is rotated coaxially with the inner ring 3. As described above, in the ball bearing 1, the diameter of the inner peripheral surface of the outer ring 2 increases from the one side toward the other side in the axial direction. Accordingly, as described later, when the ball bearing 1 (the inner ring 3) is rotated, oil flows through an annular space provided between the outer ring 2 and the inner ring 3, from the one side toward the other side in the axial direction, that is, a pumping action is caused. Since the pumping action is caused due to the rotation of the ball bearing 1, oil outside the bearing flows from the one side in the axial direction into a bearing inner area between the outer ring 2 and the inner ring 3, and flows out from the other side in the axial direction. That is, the oil passes through the bearing inner area.

(Configuration of the cage 17 on the one side in the axial direction) The shape of the annular portion 5 on the small-diameter side in the cage 17 on the one side in the axial direction (the right side in FIG. 1) will be described with reference to FIG. 2. The annular portion 5 is an annular portion on an oil inflow side into which the oil flows due to pumping action. The bar portions 7 extend from the annular portion 5 provided on the oil inflow side toward an oil outflow side. The cage 18 on the other side in the axial direction (the left side in FIG. 1) may have the same configuration as the configuration in related art.

Figure 2:
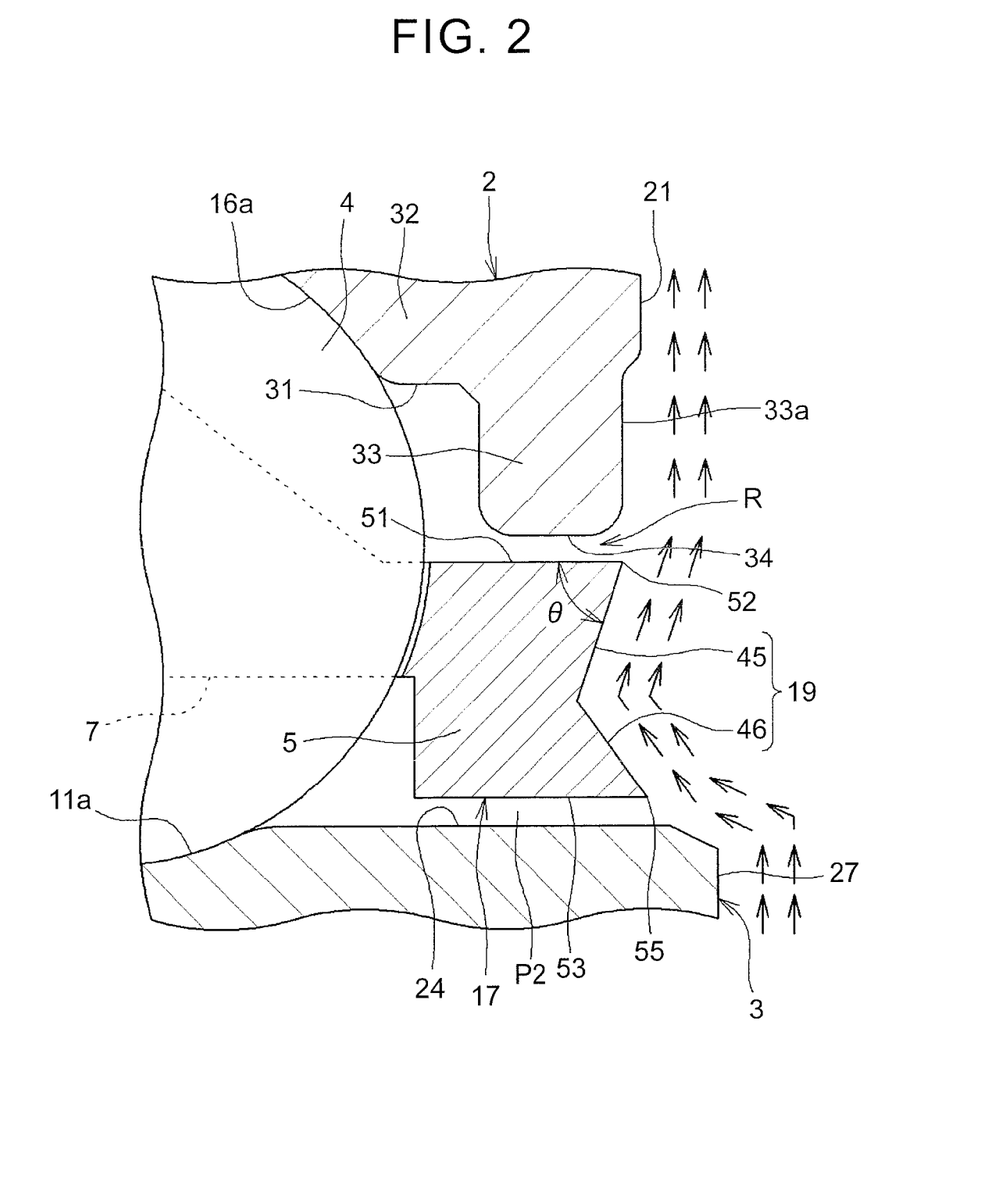
FIG. 2 is an enlarged view of a main portion of the ball bearing shown in FIG. 1.

In FIG. 2, an outer peripheral cylindrical surface 51 is provided at the outer periphery of the annular portion 5. The outer peripheral cylindrical surface 51 is continuous with the outer peripheral surface of each bar portion 7. The outer peripheral cylindrical surface 51 is disposed coaxially with an inner peripheral cylindrical surface 31 provided at the inner periphery of the outer ring 2. Further; in the embodiment, since the outer ring 2 includes the protruding portion 33, the outer peripheral cylindrical surface 51 is disposed coaxially with an inner peripheral surface 34 of the protruding portion 33. The inner peripheral surface 34 is constituted by a cylindrical surface that is coaxial with the axis C. The protruding portion 33 is provided at a position facing the outer peripheral cylindrical surface 51 (the outer peripheral surface) of the annular portion 5 such that the protruding portion 33 protrudes from the annular main body 32. Therefore, the outer peripheral cylindrical surface 51 and the inner peripheral surface 34 of the protruding portion 33 face each other in the radial direction such that a predetermined clearance is provided between the outer peripheral cylindrical surface 51 and the inner peripheral surface 34. A cylindrical space R, which is parallel to the axis C, is provided between the outer peripheral cylindrical surface 51 and the inner peripheral surface 34.

An end face 19 of the annular portion 5 on an outer side in the axial direction (hereinafter, may be referred to as "axial outer end face 19") includes an outer inclined surface 45 that is provided in an outer region of the end face 19 in the radial direction. The outer inclined surface 45 is inclined toward an axial outer side in a direction toward a radial outer side (i.e., the outer inclined surface 45 is inclined toward an outer side in the axial direction as the outer inclined surface 45 extends toward an outer side in the radial direction). The outer inclined surface 45 is a conical surface that intersects with the outer peripheral cylindrical surface 51 at an acute angle in a section including the axis C. Therefore, an outer peripheral end portion of the annular portion 5 is constituted by a corner portion 52 at which the outer inclined surface 45 intersects with the outer peripheral cylindrical surface 51 at the acute angle.

The axial position of the tip end of the corner portion 52 substantially coincides with the axial position of the side surface of the outer ring 2, the side surface of the outer ring 2 being located radially outside the tip end of the corner portion 52 to be close to the tip end of the corner portion 52. As described above, in the embodiment, since the outer ring 2 includes the protruding portion 33, the side surface of the outer ring 2, which is located radially outside the tip end of the corner portion 52 to be close to the tip end of the corner portion 52, is a side surface (i.e., an axial outer side surface) 33a of the protruding portion 33 on the outer side in the axial direction. That is, in the ball bearing 1, the axial position of the tip end of the corner portion 52 is substantially the same as the axial position of the side surface 33a of the protruding portion 33 of the outer ring 2. The positional relation between the annular portion 5 (the outer inclined surface 45) and the outer ring 2 will be described in detail later. The configuration in the case where the outer ring 2 does not include the protruding portion 33 will be described using FIG. 2, although this configuration is not shown in the figure. In the case where the outer ring 2 does not include the protruding portion 33, the side surface of the outer ring 2, which is located radially outside the tip end of the corner portion 52 to be close to the tip end of the corner portion 52, is a large end face 21 that is an end face of the outer ring 2 in the axial direction. Accordingly, in this case, the ball bearing 1 is configured such that the axial position of the tip end of the corner portion 52 is substantially the same as the axial position of the large end face 21 of the outer ring 2.

The axial outer end face 19 of the annular portion 5 includes an inner inclined surface 46 that is provided in an inner region of the end face 19 in the radial direction. The inner inclined surface 46 is inclined toward an axial inner side in a direction toward a radial outer side (i.e., the inner inclined surface 46 is inclined toward the inner side in the axial direction as the inner inclined surface 46 extends toward the outer side in the radial direction). The inner inclined surface 46 is a conical surface that intersects with the inner peripheral surface 53 of the annular portion 5 having a cylindrical shape, at an acute angle in the section including the axis C. Therefore, an inner peripheral end portion of the annular portion 5 is constituted by a corner portion 55 at which the inner inclined surface 46 intersects with the inner peripheral surface 53 at the acute angle. With regard to the tip end of the inner peripheral end portion of the annular portion 5, that is, the tip end of the corner portion 55 in the axial direction, the tip end of the corner portion 55 is provided at a position inside a small end face 27 that is a side surface of the inner ring 3 in the axial direction. With regard to the radial position of the corner portion 55, the corner portion 55 is provided close to the cylindrical surface 24 in the outer peripheral surface of the inner ring 3.

Thus, the axial outer end face 19 of the annular portion 5 includes the inner inclined surface 46 that is provided in the inner region of the end face 19 in the radial direction. The inner inclined surface 46 extends from the inner peripheral end portion (the corner portion 55) of the annular portion 5 to be inclined toward the axial inner side in the direction toward the radial outer side (i.e., the inner inclined surface 46 is inclined toward the inner side in the axial direction as the inner inclined surface 46 extends toward the outer side in the radial direction). The inner inclined surface 46 is constituted by an inclined surface that extends from the corner portion 55 that serves as a starting point. The outer inclined surface 45, which is continuous with the inner inclined surface 46, is provided in the outer region of the end face 19 such that the inclination angle of the outer inclined surface 45 is different from the inclination angle of the inner inclined surface 46 by an angle equal to or larger than 90 degrees. The outer inclined surface 45 is constituted by an inclined surface that extends to the corner portion 52 that serves as an end point.

(Flow of oil) Next, the flow of the oil when the inner ring 3 is rotated will be described with reference to FIG. 2. In the following description, in the ball bearing 1, the side on which the small end face 27 of the inner ring 3 is provided (i.e., the one side in the axial direction) may be referred to as "a small-diameter side", and the side on which the large end face 26 (refer to FIG. 1) of the inner ring 3 is provided (i.e., the other side in the axial direction) may be referred to as "a large-diameter side".

When the inner ring 3 is rotated, the oil in the bearing inner area in which the balls 4 are provided (more specifically, the oil between the balls 4 adjacent to each other) moves toward the outer raceway surface 16a due to a centrifugal force. Since the outer raceway surface 16a (refer to FIG. 1) has an arc shape such that the diameter of the outer raceway surface 16a increases from the one side toward the other side in the axial direction, the oil, which has moved toward the outer raceway surface 16a due to the centrifugal force, moves toward the large-diameter side along the outer raceway surface 16a. Thus, in the ball bearing 1, the oil flows from the small-diameter side toward the large-diameter side, that is, the so-called pumping action is caused. If the amount of oil passing through the bearing inner area is large, the oil is stirred by the balls 4, and running torque increases due to resistance to stirring, and accordingly, power loss increases in an apparatus to which the ball bearing 1 is fitted.

As described above, since the pumping action is caused, the oil flows into the bearing inner area from an opening portion between the outer ring 2 and the inner ring 3 at the small-diameter side of the ball bearing 1. As shown in FIG. 2, in the opening portion, the annular portion 5 at the small-diameter side of the cage 17 is positioned. Accordingly, in order to reduce the amount of oil that passes through the bearing inner area, it is necessary to reduce the amount of oil flowing through the space on the side of the outer periphery of the annular portion 5, and to reduce the amount of oil flowing through the space on the side of the inner periphery of the annular portion 5.

(Inflow of oil through the space on the side of the inner periphery of the annular portion 5) On the side of the inner periphery of the annular portion 5, the distance between the inner periphery of the annular portion 5 and the outer periphery of the inner ring 3 is reduced, and a labyrinth is provided. Therefore, when a clearance between the annular portion 5 and the inner ring 3 is in a given range, it is possible to reduce the amount of oil flowing through the clearance on the side of the inner periphery of the annular portion 5. Further, in order to reduce the inflow (inflow amount) of the oil on the side of the inner periphery of the annular portion 5, the ball bearing 1 in the embodiment has a function described below, in addition to the function provided by the labyrinth.

In the embodiment shown in FIG. 2, the tip end of the corner portion 55 that is the inner peripheral end portion of the annular portion 5 is provided at the position inside the small end face 27 of the inner ring 3 in the axial direction, the position being close to the cylindrical surface 24 of the inner ring 3. Further, the axial outer end face 19 of the annular portion 5 includes the inner inclined surface 46 that is provided in the inner region of the end face 19 in the radial direction. The inner inclined surface 46 is inclined toward the axial inner side in the direction from the corner portion 55 toward the radial outer side (i.e., the inner inclined surface. 46 is inclined toward the inner side in the axial direction as the inner inclined surface 46 extends from the corner portion 55 toward the outer side in the radial direction).

Accordingly, the oil having a velocity component toward the radial outer side flows along the small end face 27 of the inner ring 3 due to the centrifugal force caused by the rotation of the inner ring 3. When the oil flows away from the small end face 27, part of the oil flows toward the inner side in the axial direction. However, with the above-described configuration in the embodiment, the part of the oil flows along the inner inclined surface 46, and therefore, the part of the oil is guided toward the outer side in the radial direction (the flow is adjusted). Accordingly, it is possible to reduce the flow of the oil into the bearing inner area (i.e., the amount of oil flowing into the bearing inner area).

If the oil collides with the annular portion 5 and the flow of the oil is blocked, pressure increases in a region where the collision occurs, and the oil in the region where the pressure has increased is likely to flow into the bearing inner area through a cylindrical space P2 (inner peripheral clearance), in which the pressure is relatively low, between the cylindrical surface 24 of the inner ring 3 and the inner peripheral surface 53 of the annular portion 5. However, with the configuration in the embodiment, the oil flows along the axial outer end face (the inner inclined surface 46) of the annular portion 5, and therefore, the flow of the oil is unlikely to be blocked by the annular portion 5, and as a result, it is possible to reduce the flow of the oil into the bearing inner area. That is, it is possible to reduce the inflow (inflow amount) of oil on the side of the inner periphery of the annular portion 5.

Figure 3:
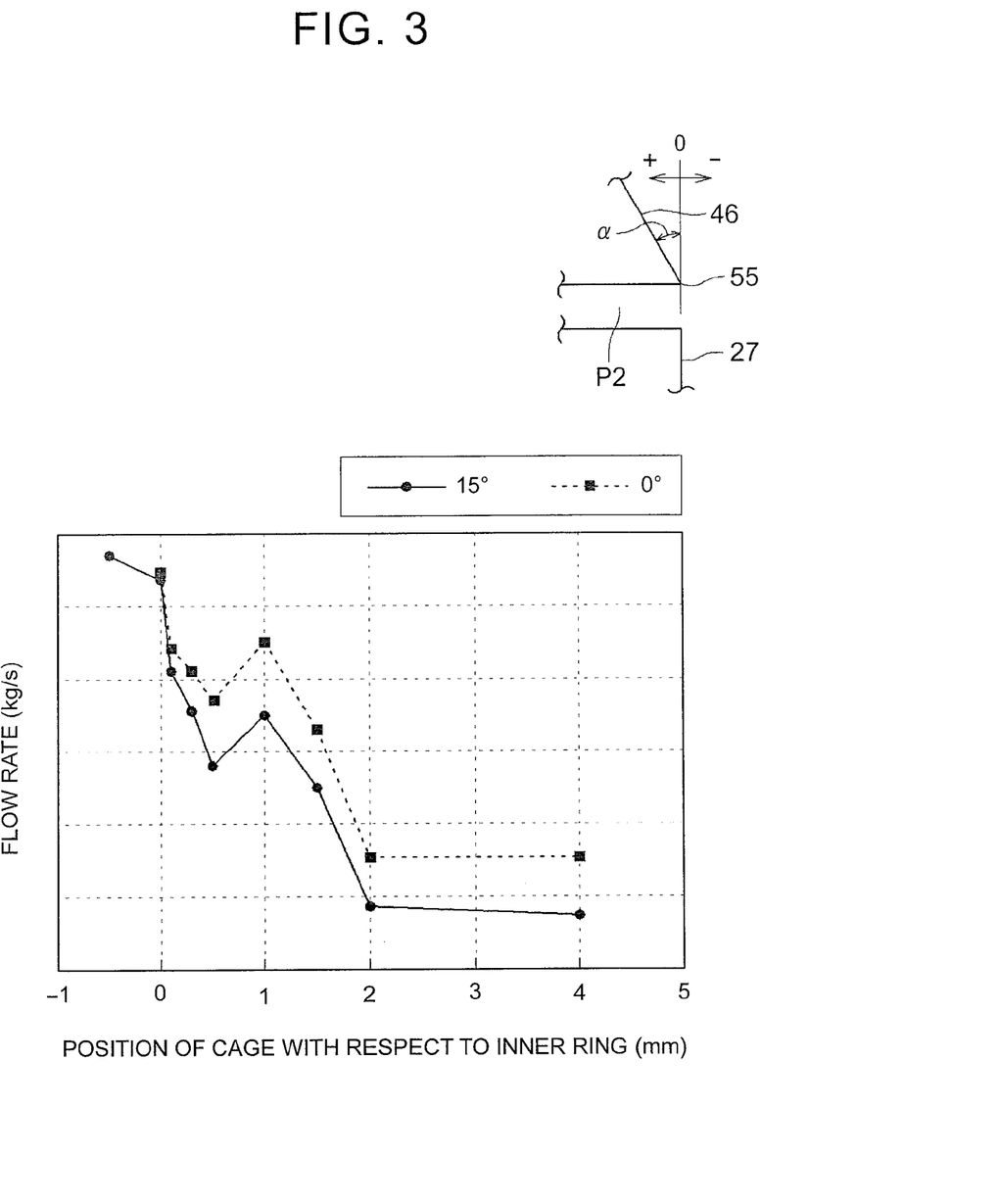
FIG. 3 is a graph showing results of calculation on flow rate characteristics in an inner peripheral clearance.

The positional relation between the tip end of the corner portion 55 of the cage 17 and the small end face 27 of the inner ring 3 in the axial direction, and the inclination angle of the inner inclined surface 46 will be described with reference to FIG. 3. FIG. 3 is a graph showing the results of calculation on the characteristics of the flow rate of the oil in the cylindrical space P2 (the inner peripheral clearance) provided between the annular portion 5 of the cage 17 and the inner ring 3. FIG. 3 shows the result of numerical analysis performed while changing the position of the tip end of the corner portion 55 with respect to the small end face 27 of the inner ring 3 in the axial direction. In FIG. 3, the abscissa axis indicates the position of the tip end of the corner portion 55 with respect to the small end face 27 of the inner ring 3 in the axial direction. The value "0" indicates the case where the axial position of the small end face 27 coincides with the axial position of the tip end of the corner portion 55. A direction, in which the tip end of the corner portion 55 is positioned inside the small end face 27 in the axial direction (i.e., the tip end of the corner portion 55 is positioned on the left of the small end face 27 in FIG. 3), is referred to as "+ direction". In FIG. 3, the ordinate axis indicates the amount (flow rate) of the oil passing through the cylindrical space P2.

In the graph shown in FIG. 3, the solid line indicates the result of analysis in the case where an inclination angle α of the inner inclined surface 46 (refer to a schematic diagram in FIG. 3) is 15 degrees. In contrast, in the graph shown in FIG. 3, the broken line indicates the result of analysis in the case where the inclination angle α is 0 degree. The conditions in the numerical analysis are as follows. The rotation speed of the inner ring was 5000/min, the temperature of oil was 80° C., and the radial clearance in the cylindrical space P2 was 0.5 mm. The outer ring 2 was fixed, and when the inner ring 3 was rotated, the cage 17 was revolved.

As apparent from FIG. 3, when the inner inclined surface 46 is inclined (α=15 degrees), the flow rate of the oil passing through the cylindrical space P2 decreases. That is, when the inner inclined surface 46 is inclined, the oil is likely to flow along the inner inclined surface 46, and accordingly, it is possible to reduce the inflow of the oil into the cylindrical space P2.

When the tip end of the corner portion 55 is away from the small end face 27 in the axial direction, the flow rate of the oil passing through the cylindrical space P2 decreases. Particularly, the axial position of the corner portion 55 may be away from the axial position of the small end face 27 such that a distance between the corner portion 55 and the small end face 27 in the axial direction is larger than 0 mm and equal to or smaller than 1 mm. The reason is considered as follows. When the oil, which has flowed along the small end face 27, flows away from the outer peripheral end portion of the small end face 27, a negative pressure region is formed at the back of the flow. When the axial position of the tip end of the corner portion 55 is relatively close to the axial position of the small end face 27 such that the distance therebetween in the axial direction is larger than 0 mm and equal to or smaller than 1 mm, the negative pressure region is formed at an inlet portion of the cylindrical space P2 (at a right side portion in FIG. 3). As a result, in the cylindrical space P2, the flow occurs from a center portion where the pressure is relatively high (a left side portion in the schematic diagram in FIG. 3) toward the inlet portion (i.e., the negative pressure region) where the pressure is low. Thus, it is possible to more effectively reduce the inflow of the oil into the cylindrical space P2 from an outside area in the axial direction. As the distance between the tip end of the corner portion 55 and the small end face 27 in the axial direction increases, the oil flowing along the small end face 27 is more unlikely to reach the cylindrical space P2, and therefore, the flow rate of the oil passing through the cylindrical space P2 decreases.

As described above, the inner inclined surface 46 is inclined toward the axial inner side in the direction toward the radial outer side (i.e., the inner inclined surface 46 is inclined toward the inner side in the axial direction as the inner inclined surface 46 extends toward the outer side in the radial direction), and the tip end of the corner portion 55 may be provided at the position inside the small end face 27 in the axial direction such that the distance between the tip end of the corner portion 55 and the small end face 27 in the axial direction is larger than 0 mm and equal to or smaller than 1 mm. In the vertical sectional view of the ball bearing 1, the angle α between a virtual plane perpendicular to the axis C and the inner inclined surface 46 may be 10 degrees to 30 degrees (refer to the schematic diagram in FIG. 3). In this case, the effect of reducing the flow rate is large.

(Inflow of the oil through the space on the side of the outer periphery of the annular portion 5) Next, the inflow of the oil through the space on the side of the outer periphery of the annular portion 5 will be described. In FIG. 2, in the ball bearing 1, the oil between the cage 17 and the inner peripheral surface of the outer ring 2 flows from the small-diameter side toward the large-diameter side along the inner peripheral surface of the outer ring 2 due to the centrifugal force. Accordingly, in the related art, the oil between the outer ring 2 and a small-diameter side end portion of the cage 17 (the annular portion 5) is sucked by the flow of the oil along the inner peripheral surface of the outer ring 2, and is guided into the bearing inner area. Therefore, it is difficult to sufficiently reduce the amount of oil passing through the ball bearing 1.

Thus, in the embodiment (refer to FIG. 2), the distance between the outer periphery of the annular portion 5 and the inner periphery of the outer ring 2 is reduced, and a labyrinth is provided. Therefore, when a clearance between the annular portion 5 and the outer ring 2 is in a given range, it is possible to reduce the inflow (inflow amount) of the oil through the space on the side of the outer periphery of the annular portion 5.

An outer peripheral cylindrical surface 51, which is parallel to the axis C, is provided on the outer periphery of the annular portion 5. The cylindrical space R is provided between the inner peripheral surface 34 of the protruding portion 33 and the outer peripheral cylindrical surface 51, the inner peripheral surface 34 being constituted by a cylindrical surface parallel to the axis C. That is, in the embodiment, the outer peripheral surface (the outer peripheral cylindrical surface 51) of the annular portion 5, and the inner peripheral surface 34 of the protruding portion 33, which faces the outer peripheral surface (the outer peripheral cylindrical surface 51), are cylindrical surfaces, and the center axis of each of the cylindrical surfaces is the axis C of the cage 17 and the outer ring 2. Therefore, the cylindrical space R is provided between the outer peripheral surface (outer peripheral cylindrical surface 51) and the inner peripheral surface 34. Since the inner peripheral surface 34 of the protruding portion 33 is a cylindrical surface constituted by a generatrix parallel to the axis C, even when the centrifugal force acts on the oil in the cylindrical space R, an aggressive flow of the oil from the small-diameter side toward the large-diameter side is not generated.

Further, in the embodiment, the outer inclined surface 45 of the end face 19 of the annular portion 5 is inclined toward the axial outer side in the direction toward the radial outer side (i.e., the outer inclined surface 45 is inclined toward the outer side in the axial direction as the outer inclined surface 45 extends toward the outer side in the radial direction), and the axial position of the tip end of the corner portion 52 is substantially the same as the axial position of the side surface 33a of the protruding portion 33 of the outer ring 2. Alternatively, as shown in a modified embodiment in FIG. 4, the outer inclined surface 45 of the end face 19 of the annular portion 5 is inclined toward the axial outer side in the direction toward the radial outer side direction (i.e., the outer inclined surface 45 is inclined toward the outer side in the axial direction as the outer inclined surface 45 extends toward the outer side in the radial direction), and the axial position of the tip end of the corner portion 52 is outside the axial position of the side surface 33a of the protruding portion 33 of the outer ring 2 in the axial direction (i.e., the position of the tip end of the corner portion 52 is on the one side in the axial direction with respect to the side surface 33a of the protruding portion 33 of the outer ring 2).

Figure 4:
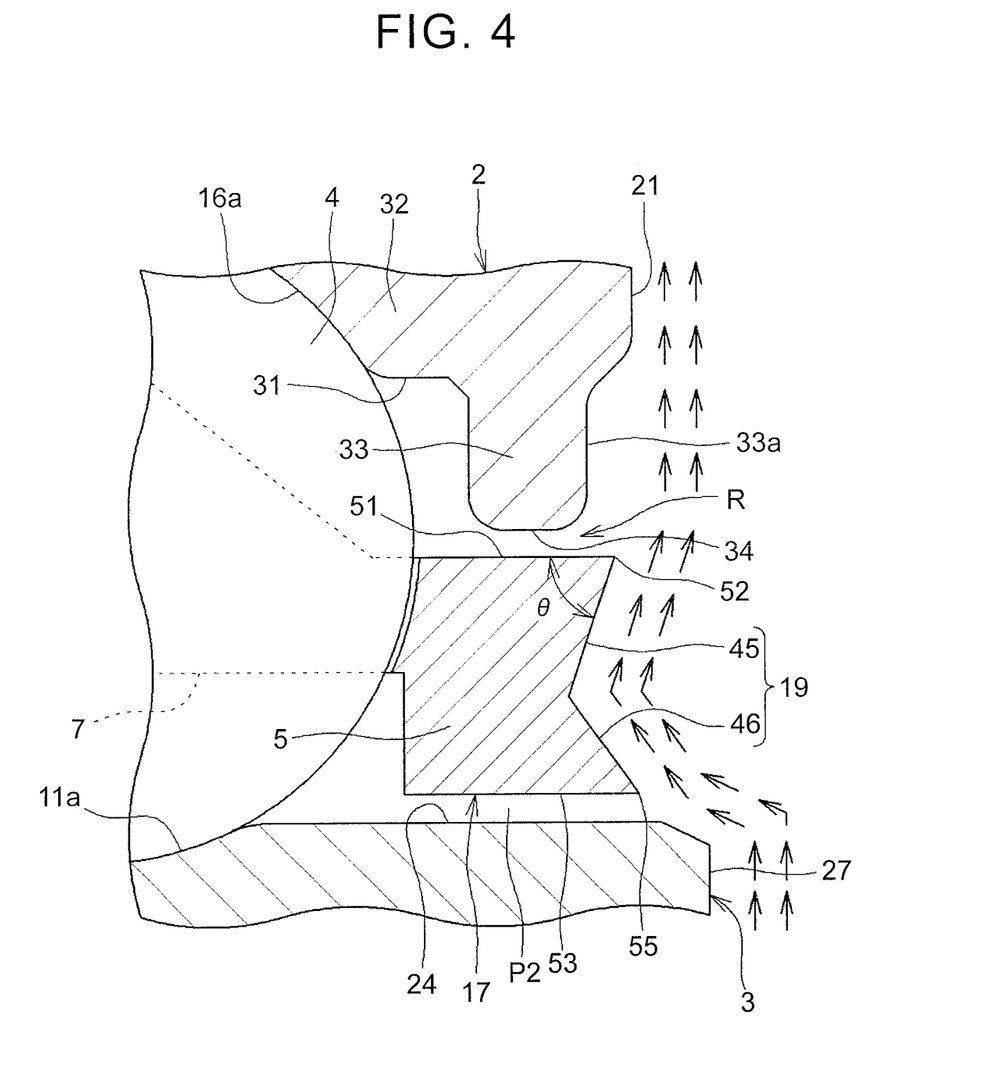
FIG. 4 is an enlarged view of a main portion of a ball bearing according to a modified embodiment.

Therefore, in each of the embodiment in FIG. 2 and the modified embodiment in FIG. 4, when the oil that has been splashed to the end face 19 of the annular portion 5 or the oil that has flowed along the inner inclined surface 46 and the outer inclined surface 45 of the end face 19 of the annular portion 5 is splashed from the corner portion 52 toward the outer side in the radial direction due to the centrifugal force, the oil is splashed in a direction away from the side surface 33a of the protruding portion 33 of the outer ring 2. Therefore, it is possible to prevent the oil from flowing into the cylindrical space R.

Further, in each of the embodiment in FIG. 2 and the modified embodiment in FIG. 4, the oil, which has flowed toward the outer side in the radial direction along the end face 19 of the annular portion 5, flows away from the corner portion 52 of the end face 19, and thus, a region where the pressure has decreased (i.e., a low pressure region) is formed at the back of the corner portion 52 (i.e., on the left of the corner portion 52 in FIGS. 2, 4). Since the axial position of the corner portion 52 is substantially the same as the axial position of the side surface 33a of the protruding portion 33, or the axial position of the corner portion 52 is outside the axial position of the side surface 33a of the protruding portion 33 in the axial direction, the low pressure region is formed at an opening portion of the cylindrical space R on the corner portion 52-side (i.e., the opening portion close to the corner portion 52).

Since the oil flows from a high-pressure side to a low-pressure side, the oil in the cylindrical space R flows from the bearing inner area in which the pressure is relatively high, toward the side surface 33a of the protruding portion 33. As a result, it is possible to reduce the amount of oil sucked from the cylindrical space R into the bearing inner area, and to reduce the inflow of the oil through the space on the side of the outer periphery of the annular portion 5.

Figure 5:
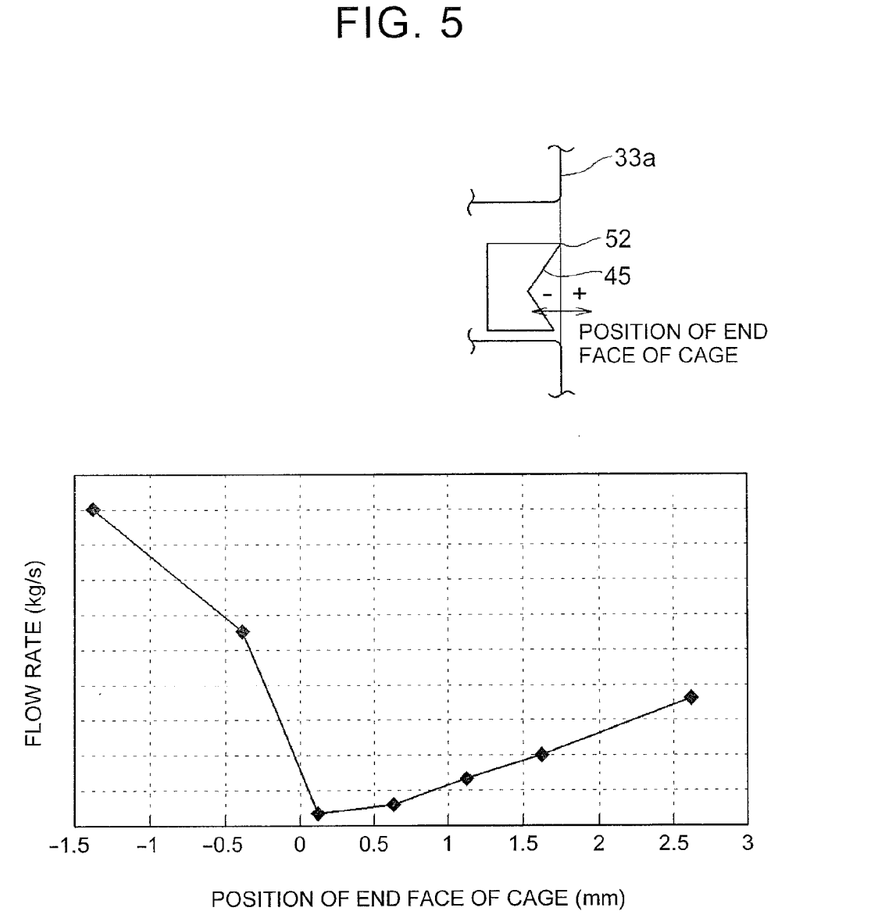
FIG. 5 is a graph showing a result of calculation on an amount (flow rate) of oil passing through a cylindrical space.

The size of the low pressure region changes depending on, for example, the rotation speed of the cage 17 and the temperature of the oil. FIG. 5 is a graph showing the result of numerical analysis performed while changing the position of the tip end of the corner portion 52 of the cage 17 with respect to the side surface of the outer ring 2 (i.e., the side surface 33a of the protruding portion 33) in the axial direction. The conditions under which the ball bearing 1 was used are as follows. The rotation speed of the inner ring was 5000/min, the temperature of the oil was 80° C., and the radial clearance in the cylindrical space R was 0.65 mm. The outer ring 2 was fixed, and when the inner ring 3 was rotated, the cage 17 was revolved together with the balls 4. In FIG. 5, the ordinate axis indicates the amount (flow rate) of the oil passing through the cylindrical space R. In this graph, as shown by the lower side (abscissa axis), the value 0 indicates the case where the axial position of the end face of the cage (i.e., the position of the tip end of the corner portion 52) coincides with the axial position of the side surface 33a of the outer ring 2. A direction (protruding direction), in which the axial position of the end face of the cage (i.e., the position of the tip end of the corner portion 52) is outside the axial position of the side surface 33a, is referred to as "a positive direction (+ direction)". In other words, the direction, in which the corner portion 52 protrudes outward beyond the side surface 33a in the axial direction, is referred to as the "+ direction". As shown in FIG. 5, the configuration is most appropriate when the corner portion 52 protrudes outward beyond the side surface 33a in the axial direction by a length in a range of approximately 0 mm to 1 mm.

Further, as a result of performing calculation while changing the angle α of the corner portion 52 (refer to FIG. 4) in the section including the axis C under the above-described condition, it has been confirmed that the effect of reducing the flow rate is large when the angle α is 45 degrees to 75 degrees.

As understood from the above description, in the ball bearing 1 having the configuration shown in each of FIG. 2 and FIG. 4, on the side of the outer periphery of the cage 17, the clearance, through which the oil flows, is closed by the low pressure region, and therefore, it is possible to reduce the inflow (inflow amount) of the oil into the bearing inner area. Accordingly, it is possible to reduce the amount of the oil flowing through the bearing inner area from the small-diameter side toward the large-diameter side. As a result, it is possible to provide the ball bearing in which the resistance to stirring of the oil is reduced, and the torque is reduced during rotation of the ball bearing.

The appropriate example of the case in which the axial position of the tip end of the corner portion 52 is "substantially the same as" the axial position of the side surface 33a of the protruding portion 33 of the outer ring 2 has been described (refer to FIG. 2). That is, as described above with reference to FIG. 5, the configuration is appropriate when the length (may be referred to as protruding length), by which the tip end of the corner portion 52 protrudes outward beyond the side surface 33a in the axial direction, is equal to or smaller than 1 mm (in other words, the distance between the tip end of the corner portion 52 and the side surface 33a in the axial direction is equal to or smaller than 1 mm). However, even in the case where the length, by which the tip end of the corner portion 52 protrudes outward beyond the side surface 33a in the axial direction, is larger than 1 mm, it is possible to reduce the inflow of the oil into the inner area of the ball bearing 1 through the space on the side of the outer periphery of the annular portion 5 when the protruding length is equal to or smaller than approximately 2.6 mm, as shown in FIG. 5. That is, the case where the axial position of the tip end of the corner portion 52 is "substantially the same as" the axial position of the side surface 33a of the outer ring 2 may include the case where the protruding length is equal to or smaller than 2.6 mm. Naturally, the case where the axial position of the tip end of the corner portion 52 is "substantially the same as" the axial position of the side surface 33a of the outer ring 2 includes the case where the protruding length is 0 (zero), that is, the axial position of the side surface 33a completely coincides with the axial position of the corner portion 52.

Figure 6:
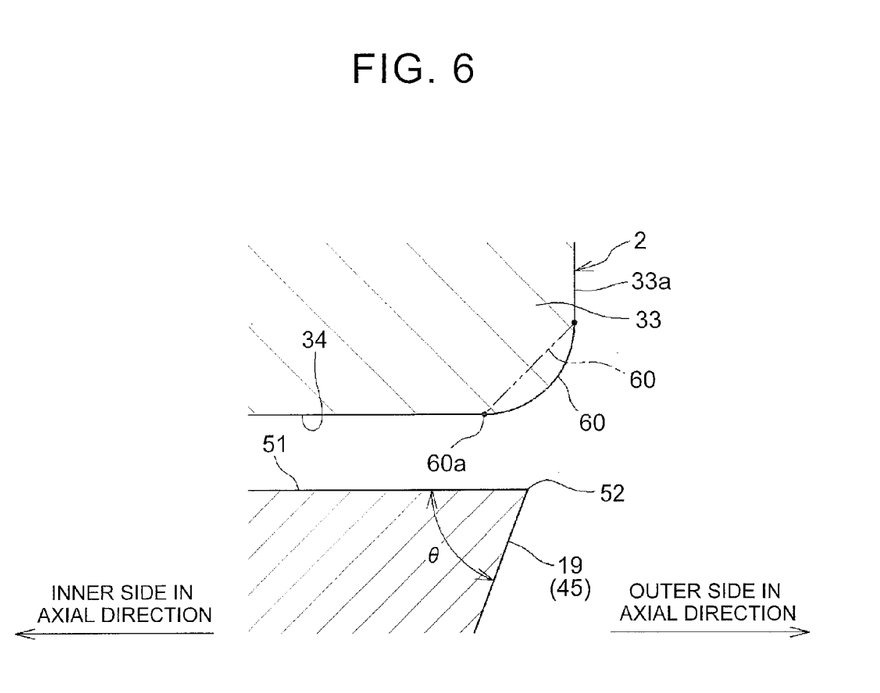
FIG. 6 is an explanatory view illustrating the case where a rounded surface is provided between a side surface of an outer ring and an inner peripheral cylindrical surface of the outer ring.

Further, the case where the axial position of the tip end of the corner portion 52 is "substantially the same as" the axial position of the side surface 33a of the outer ring 2 may include the case where the axial position of the tip end of the corner portion 52 is slightly inside the axial position of the side surface 33a of the outer ring 2 in the axial direction (i.e., the axial position of the tip end of the corner portion 52 is slightly closer to the bearing inner area in which the balls 4 are disposed than the axial position of the side surface 33a of the outer ring 2 is), as shown in FIG. 6. That is, the case where the axial position of the tip end of the corner portion 52 is "substantially the same as" the axial position of the side surface 33a of the outer ring 2 includes the case where the protruding direction is "a negative direction (− direction)". Examples of the case where the protruding direction is the negative direction (− direction) and the axial position of the tip end of the corner portion 52 is "substantially the same as" the axial position of the side surface 33a of the outer ring 2 includes the case where the protruding length is equal to or larger than −0.4 mm and smaller than 0 mm. In this case as well, it is possible to reduce the inflow of the oil into the bearing inner area through the space on the side of the outer periphery of the annular portion 5 (refer to FIG. 5). That is, the case where the axial position of the tip end of the corner portion 52 is "substantially the same as" the axial position of the side surface 33a of the outer ring 2 may include the case where the protruding length is equal to or larger than −0.4 mm and smaller than 0 mm.

Further, as shown in FIG. 6, the case where the axial position of the tip end of the corner portion 52 is "substantially the same as" the axial position of the side surface 33*a* of the outer ring 2 may include the case where a rounded surface 60 is provided between the side surface 33*a* of the protruding portion 33 that is a portion of the outer ring 2 and the inner peripheral surface 34 of the protruding portion 33, and the tip end of the corner portion 52 is positioned outside a starting point 60*a* of the rounded surface 60 on the inner peripheral surface 34-side (i.e., the starting point 60*a* close to the inner peripheral surface 34) in the axial direction. That is, the case where the axial position of the tip end of the corner portion 52 is "substantially the same as" the axial position of the side surface 33*a* of the outer ring 2 includes the case where the tip end of the corner portion 52 is positioned in a range from the side surface 33*a* to the starting point 60*a* of the rounded surface 60 in the axial direction. The case where the axial position of the tip end of the corner portion 52 is "substantially the same as" the axial position of the side surface 33*a* of the outer ring 2 includes the case where a chamfer 60 is provided instead of the rounded surface 60 as shown by a two-dot chain line in FIG. 6, and the tip end of the corner portion 52 is positioned outside the starting point 60*a* of the chamfer 60 on the inner peripheral surface 34-side (i.e., the starting point 60*a* close to the inner peripheral surface 34) in the axial direction. The radius of the rounded surface 60 (the size of the chamfer 60) may be approximately equal to or smaller than 0.5 mm.

In the configuration shown in each of FIG. 2 and FIG. 4, the axial outer end face 19 of the annular portion 5 includes the inner inclined surface 46 and the outer inclined surface 45. The inner inclined surface 46 is inclined toward the axial inner side in the direction from the corner portion 55 that is the inner peripheral end portion, toward the radial outer side (i.e., the inner inclined surface 46 is inclined toward the inner side in the axial direction as the inner inclined surface 46 extends from the corner portion 55 toward the outer side in the radial direction). The side toward which the outer inclined surface 45 is inclined differs from the side toward which the inner inclined surface 46 is inclined. The outer inclined surface 45 is inclined toward the outer side in the axial direction. Thus, it is possible to prevent the size of the annular portion 5 at the small-diameter side of the cage 17 from increasing in the axial direction. As a result, it is possible to prevent an increase in the size of the ball bearing 1 in the axial direction. If "an annular surface" perpendicular to the axis C is provided in the radially outer region of the axial outer end face 19 of the annular portion 5, instead of the outer inclined surface 45, the axial position of the corner portion 52 in the outer peripheral side of the annular portion 5 is substantially the same as the axial position of the side surface 33*a* of the outer ring 2 (or the axial position of the corner portion 52 is outside the axial position of the side surface 33*a*), and the "annular surface" is continuous with the inner inclined surface 46, the axial position of the corner portion 55 in the inner peripheral side of the annular portion 5 needs to be outside the axial position of the corner portion 55 in the embodiment. As a result, in the sectional shape of the annular portion 5, the axial length increases in a direction toward the inner side in the radial direction. If the small end face 27 of the inner ring 3 is positioned outside the corner portion 55 in the axial direction as in the embodiment, the axial position of the small end face 27 of the inner ring 3 is outside the axial position of the large end face 21 of the outer ring 2 such that the distance between the small end face 27 and the large end face 21 in the axial direction is large. As a result, the size of the ball bearing in the axial direction increases. However, in the embodiment, as described above, the axial outer end face 19 of the annular portion 5 includes the inner inclined surface 46 and the outer inclined surface 45 that are inclined toward different sides (inclined in different directions). Therefore, the axial position of the small end face 27 of the inner ring 3 is substantially the same as the axial position of the large end face 21 of the outer ring 2. Thus, it is possible to prevent an increase in the size of the bait bearing 1 in the axial direction.

Figure 7:
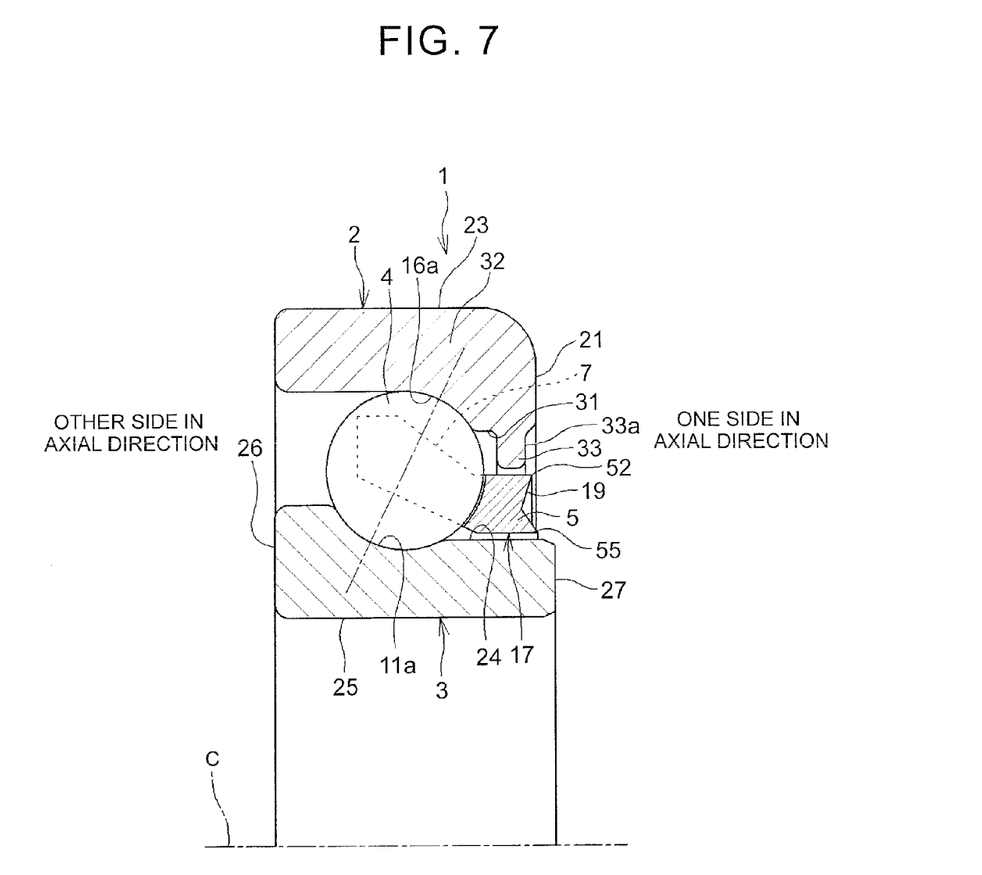
FIG. 7 is a sectional view illustrating a ball bearing according to another embodiment of the invention.

(Ball bearing 1 according to another embodiment) FIG. 7 is a sectional view showing a ball bearing 1 according to another embodiment. The ball bearing 1 is an angular contact ball bearing in which the plurality of balls 4 are disposed in a single row. The ball bearing 1 includes an outer ring 2, an inner ring 3, the balls 4 disposed between the outer ring 2 and the inner ring 3, and a cage 17 that has an annular shape and retains the balls 4 at intervals in the circumferential direction. The cage 17 shown in FIG. 1 includes the pair of annular portions 5, 6 and the plurality of bar portions 7, whereas cage 17 shown in FIG. 7 includes the annular portion 5 disposed on only the one side in the axial direction, and the bar portions 7 extend from the annular portion 5 toward the other side in the axial direction. That is, the cage 17 shown in FIG. 7 is a so-called crown type cage.

In this ball bearing 1 as well, the inner peripheral surface of the outer ring 2 includes a portion whose diameter increases from the one side toward the other side in the axial direction, and therefore, the oil flows into the area between the outer ring 2 and the inner ring 3 from the one side in the axial direction and flows out from the other side in the axial direction. Accordingly, in order to reduce the inflow of the oil into the bearing inner area in the ball bearing 1 shown in FIG. 7 as well as in the ball bearing 1 shown in FIG. 1, the shape of the annular portion 5 at the oil inflow side in the cage 17 is the same as the shape of the annular portion 5 of the cage 17 shown in FIG. 1, FIG. 2, or FIG. 4.

Figure 1:
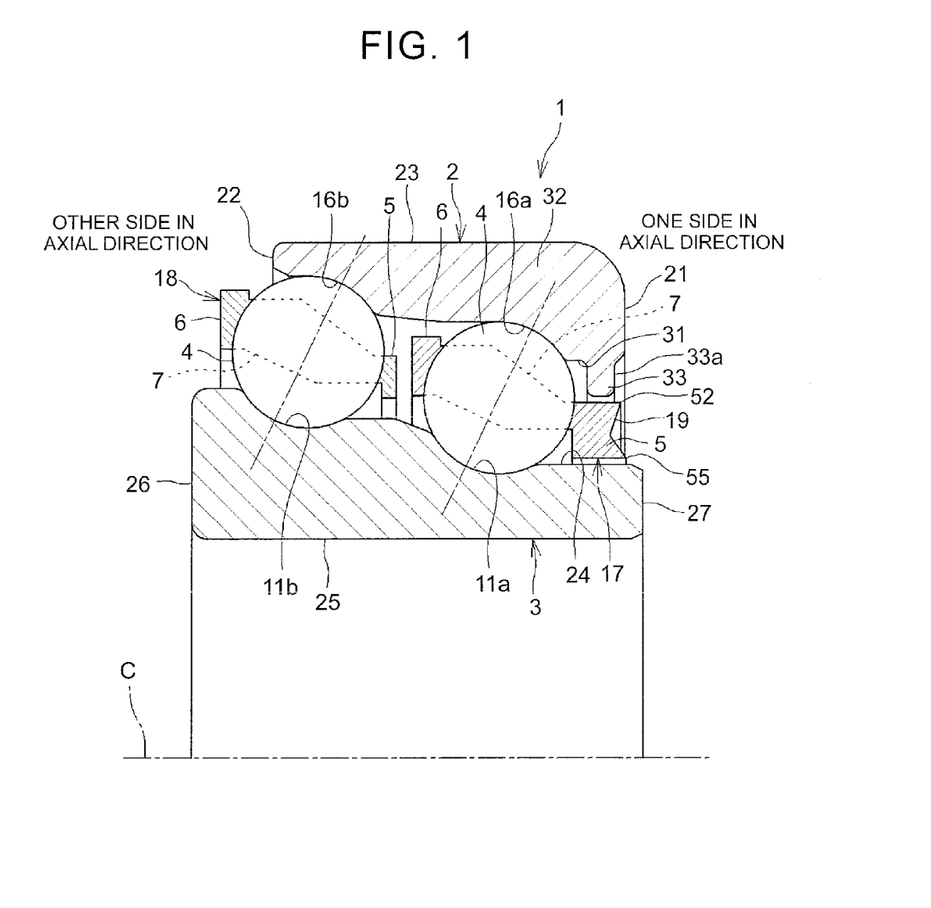
FIG. 1 is a sectional view illustrating a ball bearing according to an embodiment of the invention.

(Ball bearing 1 according to yet another embodiment) In the embodiment shown in each of FIG. 1 and FIG. 7, the outer ring 2 includes the protruding portion 33 disposed on the one side in the axial direction (i.e., the oil inflow side). However, the protruding portion 33 may be omitted. In this case, the annular portion 5 is longer in the radial direction than the annular portion 5 shown in each of FIG. 1 and FIG. 7, and thus, the annular space provided between the outer ring 2 and the inner ring 3 on the oil inflow side is closed. In this case, the axial position of the tip end of the corner portion 52 of the annular portion 5 of the cage 17 is substantially the same as the axial position of the large end face 21 of the outer ring 2. Alternatively, the axial position of the tip end of the corner portion 52 of the annular portion of the cage 17 is outside the axial position of the large end face 21 of the outer ring 2.

In the embodiment shown in FIG. 1, the cage 17 includes the pair of the annular portion 5, 6. In this case, when the cage 17 is produced by injection molding using a mold, the mold is a split mold that is divided into partial molds by moving the partial molds in the axial direction. The molded product (the cage 17) is removed from the split mold by sliding the partial molds in the axial direction. If the outside diameter of the annular portion 5 on the one side in the cage 17 is larger than the inside diameter of the annular portion 6 on the other side in the cage 17, not only the partial molds that are slid in the axial direction as described above, but also partial molds that are movable in the radial direction are required. Accordingly, as in the embodiment shown in FIG. 1, the cage 17 is configured such that the outside diameter of the annular portion 5 on the one side is smaller than the inside diameter of the annular portion 6 on the other side. In this case, the annular portion 5 is configured to be short in the radial direction. Accordingly, in order to decrease the clearance between the annular portion 5 and the outer ring 2, it is preferable that the outer ring 2 should include the protruding portion 33.

In each of the embodiments, in the ball bearing 1, the balls 4 make angular contact with the outer ring 2 and the inner ring 3. However, in other embodiments, even in the ball bearing 1 in which the balls 4 do not make angular contact with the outer ring 2 and the inner ring 3 (the contact angle is 0), for example, even in the ball bearing 1 in which the radial clearance between the outer ring 2 and the inner ring 3 on the one side in the axial direction is different from that on the other side in the axial direction, or even in the ball bearing 1 in which the diameter of the shoulder portion of the outer ring 2 on the one side in the axial direction is different from that on the other side in the axial direction, the cage 17 including the annular portion 5 in each of the above-described embodiments can be employed, in the case where the oil flows into the area between the outer ring 2 and the inner ring 3 from the one side in the axial direction, and flows out from the other side in the axial direction. That is, in the ball bearing 1 in which the one side in the axial direction and the other side in the axial direction are asymmetrical to each other, the pumping action is caused due to the centrifugal force caused by the rotation, and thus, the oil flows into the bearing inner area. Thus, in this ball bearing 1, the cage 17 including the annular portion 5 in each of the above-described embodiments can be employed. Further, even in the ball bearing 1 in which the shapes of a portion of the outer ring 2 and a portion of the inner ring 3 on the one side in the axial direction are symmetrical to the shapes of a portion of the outer ring 2 and a portion of the inner ring 3 on the other side in the axial direction, the cage 17 including the annular portion 5 in each of the above-described embodiments can be employed, in the case where when the cage 17 is rotated due to the rotation of the ball bearing 1, the cage 17 (the bar portions 7) function as a fan, and the oil flows into the area between the outer ring 2 and the inner ring 3 from the one side in the axial direction, and flows out from the other side in the axial direction.

In the double row angular contact ball bearing 1 shown in FIG. 1, the crown type cage 17 of the ball bearing 1 shown in FIG. 7 can be employed. On the other hand, in the ball bearing 1 shown in FIG. 7, the cage 17 including the pair of the annular portions 5, 6 in the ball bearing 1 shown in FIG. 1 can be employed.

The ball bearing 1 according to the invention is not limited to the illustrated embodiments, and may be realized in other embodiments in the scope of the invention. In each of the embodiments, the corner portion 52 that is the outer peripheral end portion of the annular portion 5 has an acute angle. However, for example, particularly when the corner portion 52 protrudes beyond the side surface 33a of the outer ring 2 in the positive direction (+ direction) (i.e., the axial position of the corner portion 52 is outside the axial position of the side surface 33a in the axial direction), the angle of the corner portion 52 may be 90 degrees.

The features of the ball bearing 1 (the cage 17) in the above-described embodiments include the following features. (1) The ball bearing 1 includes the outer ring 2, the inner ring 3, the plurality of balls 4 disposed between the outer ring 2 and the inner ring 3, and the cage 17 that has an annular shape and retains the balls 4 at intervals in the circumferential direction. In the ball bearing 1, oil flows into the area between the outer ring 2 and the inner ring 3 from the one side in the axial direction, and flows out from the other side in the axial direction. The cage 17 includes the annular portion 5 provided on the oil inflow side and the bar portions 7 extending from the annular portion 5 toward the oil outflow side. The axial outer end face 19 of the annular portion 5 includes the outer inclined surface 45 that is inclined toward the axial outer side in the direction toward the radial outer side.

In the ball bearing described in the above section (1), the outer peripheral end portion of the annular portion 5 may be constituted by the corner portion 52 at which the outer peripheral surface (the outer peripheral cylindrical surface 51) of the annular portion 5 intersects with the outer inclined surface 45 at an acute angle.

(2) The ball bearing 1 with the other configuration includes the outer ring 2, the inner ring 3, the plurality of balls 4 disposed between the outer ring 2 and the inner ring 3, and the cage 17 that has an annular shape and retains the balls 4 at intervals in the circumferential direction. In the ball bearing 1, oil flows into the area between the outer ring 2 and the inner ring 3 from the one side in the axial direction, and flows out from the other side in the axial direction. The cage 17 includes the annular portion 5 provided on the oil inflow side and the bar portions 7 extending from the annular portion 5 toward the oil outflow side. The outer ring 2 includes the annular main body 32, and the protruding portion 33 provided at the position facing the outer peripheral surface (the outer peripheral cylindrical surface 51) of the annular portion 5 such that the protruding portion 33 protrudes from the annular main body 32. A raceway surface 16a, on which the balls 4 roll, is provided in an inner peripheral side of the annular main body 32. Since the outer ring 2 includes the protruding portion 33, it is possible to reduce the clearance between the outer ring 2 (the protruding portion 33) and the annular portion 5 of the cage 17.

(3) The ball bearing 1 with the other configuration includes the outer ring 2, the inner ring 3, the plurality of balls 4 disposed between the outer ring 2 and the inner ring 3, and the cage 17 that has an annular shape and retains the balls 4 at intervals in the circumferential direction. In the ball bearing 1, oil flows into the area between the outer ring 2 and the inner ring 3 from the one side in the axial direction, and flows out from the other side in the axial direction. The cage 17 includes the annular portion 5 provided on the oil inflow side and the bar portions 7 extending from the annular portion 5 toward the oil outflow side. The axial outer end face 19 of the annular portion 5 includes the inner inclined surface 46 that is inclined toward the axial inner side in the direction toward the radial outer side.

What is claimed is:
1. A ball bearing comprising:
an outer ring;
an inner ring;
a plurality of balls disposed between the outer ring and the inner ring; and
a cage that has an annular shape, and retains the plurality of balls at intervals in a circumferential direction, wherein:
oil flows into an area between the outer ring and the inner ring from a first side in an axial direction and flows out from a second side in the axial direction;
the cage includes (i) an annular portion provided on an oil inflow side, and (ii) bar portions extending from the annular portion toward an oil outflow side;
an outer peripheral end portion of the annular portion includes a corner portion at which an axial outer end face of the annular portion intersects with an outer peripheral surface of the annular portion;

an axial position of a tip end of the corner portion is substantially same as an axial position of a side surface of the outer ring;

the outer ring includes an annular main body and a protruding portion that is provided at a position facing the outer peripheral surface of the annular portion such that the protruding portion protrudes from the annular main body;

a raceway surface, on which the plurality of balls roll, is provided in an inner peripheral side of the annular main body;

an axial outer side surface of the protruding portion is located inside an axial end face of the outer ring in the axial direction; and the axial position of the tip end of the corner portion is substantially same as an axial position of the axial outer side surface of the protruding portion.

2. The ball bearing according to claim 1, wherein the axial outer end face of the annular portion includes an outer inclined surface that is inclined toward an axial outer side in a direction toward a radial outer side.

3. The ball bearing according to claim 2, wherein the outer peripheral end portion of the annular portion includes the corner portion at which the outer peripheral surface of the annular portion intersects with the outer inclined surface at an acute angle.

4. The ball bearing according to claim 1, wherein the outer peripheral surface of the annular portion has a cylindrical surface whose center axis is an axis of the cage and the outer ring, and an inner peripheral surface of a portion of the outer ring has a cylindrical surface whose center axis is the axis of the cage and the outer ring, the inner peripheral surface of the portion of the outer ring facing the outer peripheral surface of the annular portion.

5. The ball bearing according to claim 1, wherein an axial position of an inner peripheral end portion of the annular portion is inside an axial position of a side surface of the inner ring in the axial direction.

6. The ball bearing according to claim 5, wherein the axial outer end face of the annular portion includes an inner inclined surface that is inclined toward an axial inner side in a direction toward a radial outer side.

7. A ball bearing comprising:
an outer ring;
an inner ring;
a plurality of balls disposed between the outer ring and the inner ring; and
a cage that has an annular shape, and retains the plurality of balls at intervals in a circumferential direction, wherein:
oil flows into an area between the outer ring and the inner ring from a first side in an axial direction and flows out from a second side in the axial direction;
the cage includes (i) an annular portion provided on an oil inflow side, and (ii) bar portions extending from the annular portion toward an oil outflow side;
an outer peripheral end portion of the annular portion includes a corner portion at which an axial outer end face of the annular portion intersects with an outer peripheral surface of the annular portion; and
an axial position of a tip end of the corner portion is outside an axial position of a first side surface of the outer ring in the axial direction, the first side surface of the outer ring being located radially outside the tip end of the corner portion and being closest to the tip end of the corner portion relative to other side surfaces of the outer ring.

8. The ball bearing according to claim 7, wherein the axial outer end face of the annular portion includes an outer inclined surface that is inclined toward an axial outer side in a direction toward a radial outer side.

9. The ball bearing according to claim 8, wherein the outer peripheral end portion of the annular portion includes the corner portion at which the outer peripheral surface of the annular portion intersects with the outer inclined surface at an acute angle.

10. The ball bearing according to claim 7, wherein:
the outer ring includes an annular main body and a protruding portion that is provided at a position facing the outer peripheral surface of the annular portion such that the protruding portion protrudes from the annular main body; and
a raceway surface, on which the plurality of balls roll, is provided in an inner peripheral side of the annular main body.

11. The ball bearing according to claim 7, wherein the outer peripheral surface of the annular portion has a cylindrical surface whose center axis is an axis of the cage and the outer ring, and an inner peripheral surface of a portion of the outer ring has a cylindrical surface whose center axis is the axis of the cage and the outer ring, the inner peripheral surface of the portion of the outer ring facing the outer peripheral surface of the annular portion.

12. The ball bearing according to claim 7, wherein an axial position of an inner peripheral end portion of the annular portion is inside an axial position of a side surface of the inner ring in the axial direction.

13. The ball bearing according to claim 12, wherein the axial outer end face of the annular portion includes an inner inclined surface that is inclined toward an axial inner side in a direction toward a radial outer side.

14. A ball bearing comprising:
an outer ring;
an inner ring;
a plurality of balls disposed between the outer ring and the inner ring; and
a cage that has an annular shape, and retains the plurality of balls at intervals in a circumferential direction, wherein:
oil flows into an area between the outer ring and the inner ring from a first side in an axial direction and flows out from a second side in the axial direction;
the cage includes (i) an annular portion provided on an oil inflow side, and (ii) bar portions extending from the annular portion toward an oil outflow side;
an outer peripheral end portion of the annular portion includes a corner portion at which an axial outer end face of the annular portion intersects with an outer peripheral surface of the annular portion;
the outer ring includes a chamfer located between a side surface of the outer ring and an inner peripheral surface of the outer ring, a starting point of the chamfer being on a side of the inner peripheral surface of the outer ring; and
an axial position of a tip end of the corner portion is outside an axial position of the starting point of the chamfer of the outer ring.

* * * * *